United States Patent
Reinhardt et al.

(10) Patent No.: US 12,398,034 B2
(45) Date of Patent: Aug. 26, 2025

(54) SYSTEMS AND METHODS FOR PRODUCING SYNGAS FROM BIO-OIL

(71) Applicant: Charm Industrial, Inc., San Francisco, CA (US)

(72) Inventors: Peter Reinhardt, San Francisco, CA (US); Jacob Wilkins, San Francisco, CA (US); Brian Jamieson, Brighton, CO (US)

(73) Assignee: Charm Industrial, Inc., San Francisco, CA (US)

( * ) Notice: Subject to any disclaimer, the term of this patent is extended or adjusted under 35 U.S.C. 154(b) by 0 days.

(21) Appl. No.: 18/970,040

(22) Filed: Dec. 5, 2024

(65) Prior Publication Data
US 2025/0091863 A1 Mar. 20, 2025

Related U.S. Application Data

(63) Continuation-in-part of application No. 18/503,036, filed on Nov. 6, 2023, now Pat. No. 12,180,074.
(Continued)

(51) Int. Cl.
*C01B 3/36* (2006.01)
*C21B 13/00* (2006.01)

(52) U.S. Cl.
CPC ............ *C01B 3/36* (2013.01); *C21B 13/0073* (2013.01); *C01B 2203/0211* (2013.01);
(Continued)

(58) Field of Classification Search
None
See application file for complete search history.

(56) References Cited

U.S. PATENT DOCUMENTS

| 3,019,100 A | 1/1962 | Robson |
| 5,078,788 A | 1/1992 | Bueno C. et al. |

(Continued)

FOREIGN PATENT DOCUMENTS

| AU | 2012324965 A1 | 3/2014 |
| CN | 101538627 A | 9/2009 |

(Continued)

OTHER PUBLICATIONS

U.S. Appl. No. 18/409,428, filed Jan. 10, 2024, Systems and Methods for Self-Reduction of Iron Ore, Reinhardt.
(Continued)

*Primary Examiner* — Colin W. Slifka
(74) *Attorney, Agent, or Firm* — Goodwin Procter LLP

(57) ABSTRACT

Disclosed herein are systems and methods for producing synthesis gas (syngas) using bio-oil. In some embodiments, syngas is produced by steam reforming bio-oil. In some embodiments, the bio-oil is provided in liquid form. In some embodiments at least some of the liquid bio-oil is transitioned into droplet form when entering a reformer for steam-reforming. In some embodiments, the reformer produces a gas stream comprising syngas, which may be fed to a furnace (e.g., direct reducing furnace, shaft furnace) for reducing iron ore to iron. In some embodiments, the amount of oxygen provided to the reformer is regulated based on an equivalence ratio (ER) corresponding to moles of oxygen fed to the reformer divided by moles of oxygen necessary to achieve stoichiometric combustion of the bio-oil, wherein an exemplary ER value is from about 0.1 to about 0.6.

19 Claims, 18 Drawing Sheets

Related U.S. Application Data

(60) Provisional application No. 63/423,476, filed on Nov. 7, 2022.

(52) U.S. Cl.
CPC .. *C01B 2203/0405* (2013.01); *C01B 2203/06* (2013.01); *C01B 2203/0838* (2013.01); *C01B 2203/1211* (2013.01)

(56) References Cited

U.S. PATENT DOCUMENTS

| | | |
|---|---|---|
| 7,198,658 B2 | 4/2007 | Sugitatsu et al. |
| 7,931,731 B2 | 4/2011 | Van Heeringen et al. |
| 8,753,422 B2 | 6/2014 | Gharda |
| 8,764,875 B2 | 7/2014 | Huang et al. |
| 8,906,131 B2 | 12/2014 | Simmons |
| 9,238,598 B2 | 1/2016 | Hammad et al. |
| 9,840,445 B2 | 12/2017 | Winter et al. |
| 10,093,996 B2 | 10/2018 | Winter et al. |
| 11,591,662 B2 | 2/2023 | Castagnola et al. |
| 2008/0311010 A1 | 12/2008 | Boe |
| 2020/0191481 A1 | 6/2020 | Cox et al. |
| 2021/0261877 A1 | 8/2021 | Despen et al. |
| 2021/0348076 A1 | 11/2021 | Despen et al. |
| 2021/0355398 A1 | 11/2021 | Despen et al. |
| 2021/0380406 A1 | 12/2021 | Zhou et al. |
| 2022/0098700 A1 | 3/2022 | Mennell et al. |
| 2022/0162077 A1 | 5/2022 | Mennell et al. |
| 2022/0162725 A1 | 5/2022 | Mennell et al. |
| 2022/0162726 A1 | 5/2022 | Mennell et al. |
| 2023/0160028 A1 | 5/2023 | Hyllander et al. |

FOREIGN PATENT DOCUMENTS

| | | |
|---|---|---|
| CN | 112892413 A | 6/2021 |
| GB | 2014604 A | 8/1979 |
| JP | S61183402 A | 8/1986 |
| JP | 7128892 B2 | 8/2022 |
| NL | 1022114 C2 | 6/2004 |
| WO | WO-2009007007 A1 | 1/2009 |
| WO | WO-2014040989 A2 | 3/2014 |
| WO | WO-2015035969 A2 | 3/2015 |
| WO | WO-2018108270 A1 * | 6/2018 ............ B01D 47/06 |
| WO | WO-2019093949 A1 | 5/2019 |
| WO | WO-2021037700 A1 | 3/2021 |
| WO | WO-2021214167 A1 | 10/2021 |
| WO | WO-2022023187 A1 | 2/2022 |
| WO | WO-2022061398 A1 | 3/2022 |
| WO | WO-2022104443 A1 | 5/2022 |
| WO | WO-2022109663 A1 | 6/2022 |
| WO | WO-2022159022 A1 | 7/2022 |
| WO | WO-2022233769 A1 | 11/2022 |
| WO | WO-2022264904 A1 | 12/2022 |
| WO | WO-2023043358 A1 | 3/2023 |
| WO | WO-2023052308 A1 | 4/2023 |
| WO | WO-2023066794 A1 | 4/2023 |

OTHER PUBLICATIONS

Rierson, D. and Albert, A., "Development of the ACCAR Process at Allis-Chalmers," Ironmaking Proceedings, 1977:455-467.

Lepinski, James, "The ACCAR system and its application to direct reduction of iron ores," Iron and Steel Engineer, Dec. 1980, 57(12) (9 pages).

Hwang, Jae Gyu, et al., "Quality improvement and tar reduction of syngas produced by bio-oil gasification," Energy, vol. 236, Jul. 13, 2021, 10 pages.

International Search Report and Written Opinion for International Patent Application No. PCT/US2023/036887, dated Mar. 1, 2024, 14 pages.

International Search Report and Written Opinion for International Patent Application No. PCT/US2024/011091, dated Mar. 27, 2024, 15 pages.

Zheng, Ji-Lu, et al., "Bio-oil gasification using air—Steam as gasifying agents in an entrained flow gasifier," Energy, vol. 142, Oct. 9, 2017 (Oct. 9,, 2017), pp. 426-435.

Vagia, E. C., et al., "Thermodynamic Analysis of Hydrogen Production via Autothermal Steam Reforming of Selected Components of Aqueous Bio-Oil Fraction," Int'l Journal of Hydrogen Energy, 33 (2008), pp. 2489-2500.

U.S. Department of Agriculture, "Bio-Oil", 2017, 2 pages.

Gordon, K., "The Assay Guide to Iron Ore", 2023, 11 pages.

* cited by examiner

Bio-Oil (Stream 001)

| | Heavy Ends | | | Light Ends | | | Medium FPBO | |
|---|---|---|---|---|---|---|---|---|
| wt% | Minimum | Maximum | wt% | Minimum | Maximum | wt% | Minimum | Maximum |
| C | 60 | 68 | C | 20 | 50 | C | 50 | 60 |
| H | 6 | 10 | H | 6 | 10 | H | 8 | 12 |
| O | 34 | 19.9 | O | 74 | 37.9 | O | 42 | 25.9 |
| N | 0 | 2 | N | 0 | 2 | N | 0 | 2 |
| S | 0 | 0.1 | S | 0 | 0.1 | S | 0 | 0.1 |

Syngas Composition (found in Stream 101)

| | Heavy Ends | | | Light Ends | |
|---|---|---|---|---|---|
| mol% | Minimum | Maximum | mol% | Minimum | Maximum |
| Particulate | 0 | 4.8 | Particulate | 0 | 4 |
| Tars | 0 | 1 | Tars | 0 | 1 |
| $H_2O$ | 0.5 | 25 | $H_2O$ | 10 | 40 |
| CO | 40 | 60 | CO | 20 | 45 |
| $CO_2$ | 5 | 15 | $CO_2$ | 10 | 30 |
| $CH_4$ | 0.5 | 5 | $CH_4$ | 0.5 | 15 |
| $H_2$ | 22 | 35 | $H_2$ | 10 | 20 |
| $O_2$ | 0 | 3 | $O_2$ | 0 | 3 |
| $N_2$ | 0 | 5 | $N_2$ | 0 | 5 |

FIG. 2

| | 001 | 002 | 101 | 201 | 202 | 301 | 401 | 402 |
|---|---|---|---|---|---|---|---|---|
| H2 (% vol) | | | 10%-25% | 10%-25% | | 10%-25% | 20%-40% | |
| CO (% vol) | | | 15%-30% | 15%-30% | | 15%-30% | 25%-45% | |
| CO2 (% vol) | | | 15%-35% | 15%-30% | | 15%-30% | 30%-50% | |
| CH4 (% vol) | | | 0.5%-2% | 0.5%-2% | | 0.5%-2% | 0.5%-2.5% | |
| other (% vol) | | | 0.1%-0.3% | 0.1%-0.3% | | 0.1%-0.3% | 0.2%-0.5% | |
| H2O (% vol) | | | 25%-60% | 25%-60% | Varies | 25%-60% | 0%-5% | |
| char | | | Varies | 0 | | | | |
| Temp (C) | 35-150 | 15-60 | 500-2000 | 250-750 | amb | 150-550 | 15-40 | amb |
| Pressure (kPa) | 3450-14000 | 100-300 | 7-15 | 1-5 | 7-15 | 1-5 | 0.5-2 | amb |

FIG. 3

| Analyte | Result | | Method | Analyzed |
|---|---|---|---|---|
| ID20220601L1 | Matrix:Oil | | Collected: 06/01/22 15:00 | |
| Determination of Conventional Chemistry Parameters | | | | |
| Viscosity @40 C | 5.5 | cSt | ASTM D445 | 07/28/22 |
| Determination of Total Metals | | | | |
| Arsenic, total | <5.0 | mg/kg | EPA 6010B | 08/04/22 |
| Barium, total | 1.00 | mg/kg | EPA 6010B | 08/04/22 |
| Cadmium, total | <1.0 | mg/kg | EPA 6010B | 08/04/22 |
| Calcium, total | 167 | mg/kg | EPA 6010B | 08/04/22 |
| Chromium, total | <3.0 | mg/kg | EPA 6010B | 08/04/22 |
| Copper, total | <3.0 | mg/kg | EPA 6010B | 08/04/22 |
| Iron, total | 23.2 | mg/kg | EPA 6010B | 08/04/22 |
| Lead, total | <5.0 | mg/kg | EPA 6010B | 08/04/22 |
| Magnesium, total | 74.5 | mg/kg | EPA 6010B | 08/04/22 |
| Manganese, total | 5.8 | mg/kg | EPA 6010B | 08/04/22 |
| Phosphorus, total | <100 | mg/kg | EPA 6010B | 08/04/22 |
| Potassium, total | 579 | mg/kg | EPA 6010B | 08/04/22 |
| Sodium, total | <100 | mg/kg | EPA 6010B | 08/04/22 |
| Zinc, total | 3.3 | mg/kg | EPA 6010 | 08/04/22 |
| Results as Received | | | | |
| Sulfur | 0.0051 | % wt | ASTM D7039 | 08/01/22 |
| Ash, Total | 3.45 | % | ASTM D482 | 07/28/22 |
| Carbon | 31.5 | % | ASTM D5291 | 07/27/22 |
| Hydrogen | 7.94 | % | ASTM D5291 | 07/27/22 |
| Nitrogen | 0.310 | % | ASTM D5291 | 07/27/22 |
| Oxygen by Difference | 56.8 | % | ASTM D5291 | 07/27/22 |
| Low Heat Value | 4656 | BTU/lb | ASTM D240 | 07/27/22 |
| High Heat Value | 5392 | BTU/lb | ASTM D240 | 07/27/22 |
| Water by Coulometric Karl Fischer | | | | |
| Water | 38.8 | % | ASTM D6304 | 07/28/22 |

FIG. 4A

| Analyte | Result | | Method | Analyzed |
|---|---|---|---|---|
| ID20220609L2 | Collected: 06/09/22 13:45 | Matrix:Oil | | |
| Determination of Conventional Chemistry Parameters | | | | |
| Viscosity @40 C | 357.8 | cSt | ASTM D445 | 07/28/22 |
| Determination of Total Metals | | | | |
| Arsenic, total | <10.0 | mg/kg | EPA 6010B | 08/04/22 |
| Barium, total | 4.42 | mg/kg | EPA 6010B | 08/04/22 |
| Cadmium, total | <2.0 | mg/kg | EPA 6010B | 08/04/22 |
| Calcium, total | 465 | mg/kg | EPA 6010B | 08/04/22 |
| Chromium, total | <6.0 | mg/kg | EPA 6010B | 08/04/22 |
| Copper, total | <6.0 | mg/kg | EPA 6010B | 08/04/22 |
| Iron, total | 85.5 | mg/kg | EPA 6010B | 08/04/22 |
| Lead, total | <10.0 | mg/kg | EPA 6010B | 08/04/22 |
| Magnesium, total | 111 | mg/kg | EPA 6010B | 08/04/22 |
| Manganese, total | 8.9 | mg/kg | EPA 6010B | 08/04/22 |
| Phosphorus, total | <200 | mg/kg | EPA 6010B | 08/04/22 |
| Potassium, total | 390 | mg/kg | EPA 6010B | 08/04/22 |
| Sodium, total | <200 | mg/kg | EPA 6010B | 08/04/22 |
| Zinc, total | <6.0 | mg/kg | EPA 6010 | 08/04/22 |
| Results as Received | | | | |
| Sulfur | 0.0130 | % wt | ASTM D7039 | 08/01/22 |
| Ash, Total | 0.637 | % | ASTM D482 | 07/28/22 |
| Carbon | 34.5 | % | ASTM D5291 | 07/27/22 |
| Hydrogen | 7.88 | % | ASTM D5291 | 07/27/22 |
| Nitrogen | 0.330 | % | ASTM D5291 | 07/27/22 |
| Oxygen by Difference | 56.6 | % | ASTM D5291 | 07/27/22 |
| Low Heat Value | 4948 | BTU/lb | ASTM D240 | 07/27/22 |
| High Heat Value | 5678 | BTU/lb | ASTM D240 | 07/27/22 |
| Water by Coulometric Karl Fischer | | | | |
| Water | 21.2 | % | ASTM D6304 | 07/28/22 |

FIG. 4B

| Analyte | Result | Method | Analyzed |
|---|---|---|---|
| ID 20220629L3 | Matrix Oil | Collected 06/29/22 12:00 | |
| Results as Received | | | |
| Sulfur | 0.0068 % wt | ASTM D7039 | 08/01/22 |
| Ash, Total | 4.72 % | ASTM D482 | 07/28/22 |
| Carbon | 47.7 % | ASTM D5291 | 07/27/22 |
| Hydrogen | 6.84 % | ASTM D5291 | 07/27/22 |
| Nitrogen | 0.330 % | ASTM D5291 | 07/27/22 |
| Oxygen by Difference | 40.4 % | ASTM D5291 | 07/27/22 |
| Low Heat Value | 76110 BTU/lb | ASTM D240 | 07/27/22 |
| High Heat Value | 8247 BTU/lb | ASTM D240 | 07/27/22 |
| Water by Coulometric Karl Fischer | | | |
| Water | 18.3 % | ASTM D6304 | 07/28/22 |

FIG. 4C

| Analyte | Result | Method | Analyzed |
|---|---|---|---|
| ID 20220630L4 | Matrix Oil | Collected 06/30/22 12:00 | |
| Results as Received | | | |
| Ash, Total | 0.147 % | ASTM D482 | 07/28/22 |
| Sulfur | 0.03 % wt | ASTM D4239 | 08/02/22 |
| Carbon | 55.0 % | ASTM D5291 | 07/27/22 |
| Hydrogen | 6.35 % | ASTM D5291 | 07/27/22 |
| Nitrogen | 0.300 % | ASTM D5291 | 07/27/22 |
| Oxygen by Difference | 38.2 % | ASTM D240 | 07/27/22 |
| Low Heat Value | 8992 BTU/lb | ASTM D240 | 07/27/22 |
| High Heat Value | 9580 BTU/lb | | |
| Water by Coulometric Karl Fischer | | | |
| Water | 9.88 % | ASTM D6304 | 07/28/22 |

FIG. 4D

| Analyte | Result | Method | Analyzed |
|---|---|---|---|
| ID 2022071IL5 | Matrix: Oil | Collected: 07/11/22 12:00 | |
| Results as Received | | | |
| Sulfur | 0.0129 % wt | ASTM D7039 | 08/01/22 |
| Ash, Total | 5.26 % | ASTM D482 | 07/28/22 |
| Carbon | 48.3 % | ASTM D5291 | 07/27/22 |
| Hydrogen | 6.88 % | ASTM D5291 | 07/27/22 |
| Nitrogen | 0.310 % | ASTM D5291 | 07/27/22 |
| Oxygen by Difference | 39.2 % | ASTM D5291 | 07/27/22 |
| Low Heat Value | 7711 BTU/lb | ASTM D240 | 07/27/22 |
| High Heat Value | 8349 BTU/lb | ASTM D240 | 07/27/22 |
| Water by Coulometric Karl Fischer | | | |
| Water | 18.0 % | ASTM D6304 | 07/28/22 |

FIG. 4E

| Analyte | Result | Method | Analyzed |
|---|---|---|---|
| ID 202207126 | Matrix Oil Collected 07/12/22 12:00 | | |
| Results as Received | | | |
| Sulfur | 0.0089 % wt | ASTM D7039 | 08/01/22 |
| Ash, Total | 1.50 % | ASTM D482 | 07/28/22 |
| Carbon | 46.6 % | ASTM D5291 | 07/27/22 |
| Hydrogen | 7.04 % | ASTM D5291 | 07/27/22 |
| Nitrogen | 0.340 % | ASTM D5291 | 07/27/22 |
| Oxygen by Difference | 44.5 % | ASTM D240 | 07/27/22 |
| Low Heat Value | 7344 BTU/lb | ASTM D240 | 07/27/22 |
| High Heat Value | 7996 BTU/lb | | |
| Water by Coulometric Karl Fischer | | | |
| Water | 20.8 % | ASTM D6304 | 07/28/22 |

FIG. 4F

| Analyte | Result | Method | Analyzed |
|---|---|---|---|
| ID:20220624C1 | Matrix:BioMass | Collected: 06/24/22 12:00 | |
| Determination of Total Metals | | | |
| Phosphorus, total | 369 mg/kg | EPA 6010B | 08/05/22 |
| Potassium, total | 4230 mg/kg | EPA 6010B | 08/05/22 |
| Results as Received | | | |
| Moisture | 3.74 % wt | ASTM D7582 | 07/29/22 |
| Ash | 17.41 % wt | ASTM D7582 | 07/29/22 |
| Volatile Matter | 46.81 % wt | ASTM D7582 | 07/29/22 |
| Fixed Carbon | 32.05 % wt | ASTM D7582 | 07/29/22 |
| Sulfur | 0.10 % wt | ASTM D4239 | 07/29/22 |
| Carbon | 51.42 % wt | ASTM D5291 | 07/27/22 |
| Hydrogen | 3.94 % wt | ASTM D5291 | 07/27/22 |
| Nitrogen | 0.30 % wt | ASTM D5291 | 07/27/22 |
| Oxygen by Difference | 26.83 % wt | ASTM D5291 | 07/27/22 |
| Low Heat Value | 8262 BTU/lb | ASTM E711 | 07/27/22 |
| High Heat Value | 8627 BTU/lb | ASTM E711 | 07/27/22 |
| Results Dry Weight Corrected | | | |
| Ash | 18.08 % wt | ASTM D7582 | 07/29/22 |
| Volatile Matter | 48.63 % wt | ASTM D7582 | 07/29/22 |
| Fixed Carbon | 33.29 % wt | ASTM D7582 | 07/29/22 |
| Sulfur | 0.10 % wt | ASTM D4239 | 07/29/22 |
| Carbon | 53.42 % wt | ASTM D5291 | 07/27/22 |
| Hydrogen | 3.66 % wt | ASTM D5291 | 07/27/22 |
| Nitrogen | 0.31 % wt | ASTM D5291 | 07/27/22 |
| Oxygen by Difference | 24.43 % wt | ASTM D5291 | 07/27/22 |
| Low Heat Value | 8583 BTU/lb | ASTM E711 | 07/27/22 |
| High Heat Value | 8962 BTU/lb | ASTM E711 | 07/27/22 |

FIG. 4G

| Analyte | Result | | Method | Analyzed |
|---|---|---|---|---|
| ID:20220624C2 | Matrix:BioMass | | | Collected: 06/24/22 12:00 |
| Determination of Total Metals | | | | |
| Phosphorus, total | 575 | mg/kg | EPA 6010B | 08/05/22 |
| Potassium, total | 7090 | mg/kg | EPA 6010B | 08/05/22 |
| Results as Received | | | | |
| Moisture | 5.17 | % wt | ASTM D7582 | 07/29/22 |
| Ash | 10.26 | % wt | ASTM D7582 | 07/29/22 |
| Volatile Matter | 32.80 | % wt | ASTM D7582 | 07/29/22 |
| Fixed Carbon | 51.77 | % wt | ASTM D7582 | 07/29/22 |
| Sulfur | 0.08 | % wt | ASTM D4239 | 07/27/22 |
| Carbon | 62.84 | % wt | ASTM D5291 | 07/27/22 |
| Hydrogen | 3.11 | % wt | ASTM D5291 | 07/27/22 |
| Nitrogen | 0.47 | % wt | ASTM D5291 | 07/27/22 |
| Oxygen by Difference | 23.25 | % wt | ASTM D5291 | 07/27/22 |
| Low Heat Value | 9596 | BTU/lb | ASTM E711 | 07/27/22 |
| High Heat Value | 9884 | BTU/lb | ASTM E711 | 07/27/22 |
| Results Dry Weight Corrected | | | | |
| Ash | 10.82 | % wt | ASTM D7582 | 07/29/22 |
| Volatile Matter | 34.58 | % wt | ASTM D7582 | 07/29/22 |
| Fixed Carbon | 54.59 | % wt | ASTM D7582 | 07/29/22 |
| Sulfur | 0.08 | % wt | ASTM D4239 | 07/27/22 |
| Carbon | 66.26 | % wt | ASTM D5291 | 07/27/22 |
| Hydrogen | 2.67 | % wt | ASTM D5291 | 07/27/22 |
| Nitrogen | 0.49 | % wt | ASTM D5291 | 07/27/22 |
| Oxygen by Difference | 19.67 | % wt | ASTM D5291 | 07/27/22 |
| Low Heat Value | 10120 | BTU/lb | ASTM E711 | 07/27/22 |
| High Heat Value | 10420 | BTU/lb | ASTM E711 | 07/27/22 |

FIG. 4H

| Analyte | Result | | Method | Analyzed |
|---|---|---|---|---|
| ID 20220624C3 | Matrix:BioMass | | Collected: 06/24/22 12:00 | |
| Determination of Total Metals | | | | |
| Phosphorus, total | 400 | mg/kg | EPA 6010B | 08/05/22 |
| Potassium, total | 5960 | mg/kg | EPA 6010B | 08/05/22 |
| Results as Received | | | | |
| Moisture | 7.04 | % wt | ASTM D7582 | 07/29/22 |
| Ash | 11.64 | % wt | ASTM D7582 | 07/29/22 |
| Volatile Matter | 27.79 | % wt | ASTM D7582 | 07/29/22 |
| Fixed Carbon | 53.53 | % wt | ASTM D7582 | 07/29/22 |
| Sulfur | 0.02 | % wt | ASTM D4239 | 07/27/22 |
| Carbon | 66.78 | % wt | ASTM D5291 | 07/27/22 |
| Hydrogen | 3.35 | % wt | ASTM D5291 | 07/27/22 |
| Nitrogen | 0.40 | % wt | ASTM D5291 | 07/27/22 |
| Oxygen by Difference | 17.81 | % wt | ASTM E711 | 07/27/22 |
| Low Heat Value | 9815 | BTU/lb | ASTM E711 | 07/27/22 |
| High Heat Value | 10130 | BTU/lb | ASTM E711 | 07/27/22 |
| Results Dry Weight Corrected | | | | |
| Ash | 12.53 | % wt | ASTM D7582 | 07/29/22 |
| Volatile Matter | 29.89 | % wt | ASTM D7582 | 07/29/22 |
| Fixed Carbon | 57.58 | % wt | ASTM D7582 | 07/29/22 |
| Sulfur | 0.02 | % wt | ASTM D4239 | 07/27/22 |
| Carbon | 71.84 | % wt | ASTM D5291 | 07/27/22 |
| Hydrogen | 2.76 | % wt | ASTM D5291 | 07/27/22 |
| Nitrogen | 0.43 | % wt | ASTM D5291 | 07/27/22 |
| Oxygen by Difference | 12.43 | % wt | ASTM E711 | 07/27/22 |
| Low Heat Value | 10560 | BTU/lb | ASTM E711 | 07/27/22 |
| High Heat Value | 10890 | BTU/lb | ASTM E711 | 07/27/22 |

FIG. 4I

| Analyte | Result | | Method | Analyzed |
|---|---|---|---|---|
| ID:20220624C4 | Matrix:BioMass | | Collected: 06/24/22 12:00 | |
| Determination of Total Metals | | | | |
| Phosphorus, total | 2680 | mg/kg | EPA 6010B | 08/05/22 |
| Potassium, total | 41900 | mg/kg | EPA 6010B | 08/05/22 |
| Results as Received | | | | |
| Moisture | 0.78 | % wt | ASTM D7582 | 07/29/22 |
| Ash | 75.25 | % wt | ASTM D7582 | 07/29/22 |
| Volatile Matter | 23.91 | % wt | ASTM D7582 | 07/29/22 |
| Fixed Carbon | 0.06 | % wt | ASTM D7582 | 07/29/22 |
| Sulfur | <0.01 | % wt | ASTM D4239 | 07/29/22 |
| Carbon | 9.63 | % wt | ASTM D5291 | 07/27/22 |
| Hydrogen | <0.50 | % wt | ASTM D5291 | 07/27/22 |
| Nitrogen | 0.23 | % wt | ASTM D5291 | 07/27/22 |
| Oxygen by Difference | 14.67 | % wt | ASTM D5291 | 07/27/22 |
| Low Heat Value | 79 | BTU/lb | ASTM E711 | 07/27/22 |
| High Heat Value | 99 | BTU/lb | ASTM E711 | 07/27/22 |
| Results Dry Weight Corrected | | | | |
| Ash | 75.83 | % wt | ASTM D7582 | 07/29/22 |
| Volatile Matter | 24.10 | % wt | ASTM D7582 | 07/29/22 |
| Fixed Carbon | 0.06 | % wt | ASTM D7582 | 07/29/22 |
| Sulfur | <0.01 | % wt | ASTM D4239 | 07/29/22 |
| Carbon | 9.71 | % wt | ASTM D5291 | 07/27/22 |
| Hydrogen | <0.50 | % wt | ASTM D5291 | 07/27/22 |
| Nitrogen | 0.23 | % wt | ASTM D5291 | 07/27/22 |
| Oxygen by Difference | 14.09 | % wt | ASTM D5291 | 07/27/22 |
| Low Heat Value | 79 | BTU/lb | ASTM E711 | 07/27/22 |
| High Heat Value | 99 | BTU/lb | ASTM E711 | 07/27/22 |

| Analyte | Result | | Method | Analyzed |
|---|---|---|---|---|
| ID:20220708C3 | Matrix:BioMass | | Collected: 07/08/22 12:00 | |
| Determination of Total Metals | | | | |
| Phosphorus, total | 308 | mg/kg | EPA 6010B | 08/05/22 |
| Potassium, total | 4070 | mg/kg | EPA 6010B | 08/05/22 |
| Results as Received | | | | |
| Moisture | 41.69 | % wt | ASTM D7582 | 07/29/22 |
| Ash | 5.37 | % wt | ASTM D7582 | 07/29/22 |
| Volatile Matter | 16.98 | % wt | ASTM D7582 | 07/29/22 |
| Fixed Carbon | 35.95 | % wt | ASTM D7582 | 07/29/22 |
| Sulfur | 0.05 | % wt | ASTM D4239 | 07/29/22 |
| Carbon | 43.59 | % wt | ASTM D5291 | 07/27/22 |
| Hydrogen | 5.68 | % wt | ASTM D5291 | 07/27/22 |
| Nitrogen | 0.29 | % wt | ASTM D5291 | 07/27/22 |
| Oxygen by Difference | 45.02 | % wt | ASTM D5291 | 07/27/22 |
| Low Heat Value | 6214 | BTU/lb | ASTM E711 | 07/27/22 |
| High Heat Value | 6741 | BTU/lb | ASTM E711 | 07/27/22 |
| Results Dry Weight Corrected | | | | |
| Ash | 9.22 | % wt | ASTM D7582 | 07/29/22 |
| Volatile Matter | 29.13 | % wt | ASTM D7582 | 07/29/22 |
| Fixed Carbon | 61.66 | % wt | ASTM D7582 | 07/29/22 |
| Sulfur | 0.09 | % wt | ASTM D4239 | 07/29/22 |
| Carbon | 74.75 | % wt | ASTM D5291 | 07/27/22 |
| Hydrogen | 1.74 | % wt | ASTM D5291 | 07/27/22 |
| Nitrogen | 0.50 | % wt | ASTM D5291 | 07/27/22 |
| Oxygen by Difference | 13.70 | % wt | ASTM D5291 | 07/27/22 |
| Low Heat Value | 10660 | BTU/lb | ASTM E711 | 07/27/22 |
| High Heat Value | 11560 | BTU/lb | ASTM E711 | 07/27/22 |

| Analyte | Result | | Method | Analyzed |
|---|---|---|---|---|
| ID20220708C4 | Matrix:BioMass | | | Collected: 07/08/22 12:00 |
| Determination of Total Metals | | | | |
| Phosphorus, total | 440 | mg/kg | EPA 6010B | 08/05/22 |
| Potassium, total | 5310 | mg/kg | EPA 6010B | 08/05/22 |
| Results as Received | | | | |
| Moisture | 4.02 | % wt | ASTM D7582 | 07/29/22 |
| Ash | 12.33 | % wt | ASTM D7582 | 07/29/22 |
| Volatile Matter | 34.82 | % wt | ASTM D7582 | 07/29/22 |
| Fixed Carbon | 48.83 | % wt | ASTM D7582 | 07/29/22 |
| Sulfur | 0.03 | % wt | ASTM D4239 | 07/27/22 |
| Carbon | 63.26 | % wt | ASTM D5291 | 07/27/22 |
| Hydrogen | 3.46 | % wt | ASTM D5291 | 07/27/22 |
| Nitrogen | 0.39 | % wt | ASTM D5291 | 07/27/22 |
| Oxygen by Difference | 20.52 | % wt | ASTM E711 | 07/27/22 |
| Low Heat Value | 9570 | BTU/lb | ASTM E711 | 07/27/22 |
| High Heat Value | 9890 | BTU/lb | ASTM E711 | 07/27/22 |
| Results Dry Weight Corrected | | | | |
| Ash | 12.84 | % wt | ASTM D7582 | 07/27/22 |
| Volatile Matter | 36.28 | % wt | ASTM D7582 | 07/27/22 |
| Fixed Carbon | 50.87 | % wt | ASTM D7582 | 07/27/22 |
| Sulfur | 0.03 | % wt | ASTM D4239 | 07/27/22 |
| Carbon | 65.91 | % wt | ASTM D5291 | 07/27/22 |
| Hydrogen | 3.14 | % wt | ASTM D5291 | 07/27/22 |
| Nitrogen | 0.41 | % wt | ASTM D5291 | 07/27/22 |
| Oxygen by Difference | 17.66 | % wt | ASTM E711 | 07/27/22 |
| Low Heat Value | 9970 | BTU/lb | ASTM E711 | 07/27/22 |
| High Heat Value | 10300 | BTU/lb | ASTM E711 | 07/27/22 |

FIG. 4L

| Analyte | Result | Method | Analyzed |
|---|---|---|---|
| ID:20220718B1 | Matrix:BioMass | Collected: 07/18/22 17:30 | |
| Results as Received | | | |
| Moisture | 7.25 % wt | ASTM D7582 | 07/29/22 |
| Ash | 1.76 % wt | ASTM D7582 | 07/29/22 |
| Volatile Matter | 74.77 % wt | ASTM D7582 | 07/29/22 |
| Fixed Carbon | 16.23 % wt | ASTM D7582 | 07/29/22 |
| Sulfur | <0.01 % wt | ASTM D4239 | 07/27/22 |
| Carbon | 46.64 % wt | ASTM D5291 | 07/27/22 |
| Hydrogen | 6.10 % wt | ASTM D5291 | 07/27/22 |
| Nitrogen | 0.22 % wt | ASTM D5291 | 07/27/22 |
| Oxygen by Difference | 45.28 % wt | | 07/27/22 |
| Low Heat Value | 7169 BTU/lb | ASTM E711 | 07/27/22 |
| High Heat Value | 7735 BTU/lb | ASTM E711 | 07/27/22 |
| Results Dry Weight Corrected | | | |
| Ash | 1.89 % wt | ASTM D7582 | 07/29/22 |
| Volatile Matter | 80.61 % wt | ASTM D7582 | 07/29/22 |
| Fixed Carbon | 17.50 % wt | ASTM D7582 | 07/29/22 |
| Sulfur | <0.01 % wt | ASTM D4239 | 07/27/22 |
| Carbon | 50.28 % wt | ASTM D5291 | 07/27/22 |
| Hydrogen | 5.70 % wt | ASTM D5291 | 07/27/22 |
| Nitrogen | 0.23 % wt | ASTM D5291 | 07/27/22 |
| Oxygen by Difference | 41.89 % wt | | 07/27/22 |
| Low Heat Value | 7729 BTU/lb | ASTM E711 | 07/27/22 |
| High Heat Value | 8339 BTU/lb | ASTM E711 | 07/27/22 |

FIG. 4M

SYSTEMS AND METHODS FOR PRODUCING SYNGAS FROM BIO-OIL

CROSS-REFERENCE TO RELATED APPLICATIONS

This application is a continuation-in-part of U.S. patent application Ser. No. 18/503,036, filed Nov. 6, 2023, which claims the benefit of and priority to U.S. Provisional Patent Application No. 63/423,476, filed Nov. 7, 2022, the entire disclosure of each of which is hereby incorporated by reference.

BACKGROUND

Synthesis gas (syngas) is used by a variety of industrial processes for the production of various materials, such as methanol production for plastics and fabrics, kerosene production for airplanes, iron ore reduction for, among others, steel production, and ammonia production for fertilizer. Typically, a fossil fuel feedstock like coal or natural gas is used to produce syngas, which comprises carbon monoxide (CO) and hydrogen ($H_2$). Such use of fossil fuels can significantly increase global carbon dioxide emissions. Accordingly, there is a need to produce syngas using alternative means having a reduced carbon footprint.

SUMMARY

Disclosed herein, in some aspects, is a process for producing syngas, comprising: providing bio-oil to a reformer, wherein the bio-oil is at least partially atomized when entering the reformer; and reforming the bio-oil within the reformer, thereby producing syngas.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

BRIEF DESCRIPTION OF THE DRAWINGS

These and other features, aspects, and advantages of some embodiments will become better understood with regard to the following description and accompanying drawings.

Figures (FIGS. 1A-1B depict flow diagrams for exemplary systems and processes for producing syngas from bio-oil, according to embodiments disclosed herein.

FIG. 2 provides exemplary compositions of bio-oil and corresponding syngas produced from reforming the bio-oil, according to an embodiment herein.

FIG. 3 provides exemplary conditions and composition information relating to the streams depicted in FIG. 1A (stream 001, 002, 101) and FIG. 1B (all streams), according to an embodiment disclosed herein.

FIGS. 4A-4M provide exemplary compositions in the feed bio-oil for producing syngas, according to an embodiment described herein.

DETAILED DESCRIPTION

Definitions

Figure 1A:
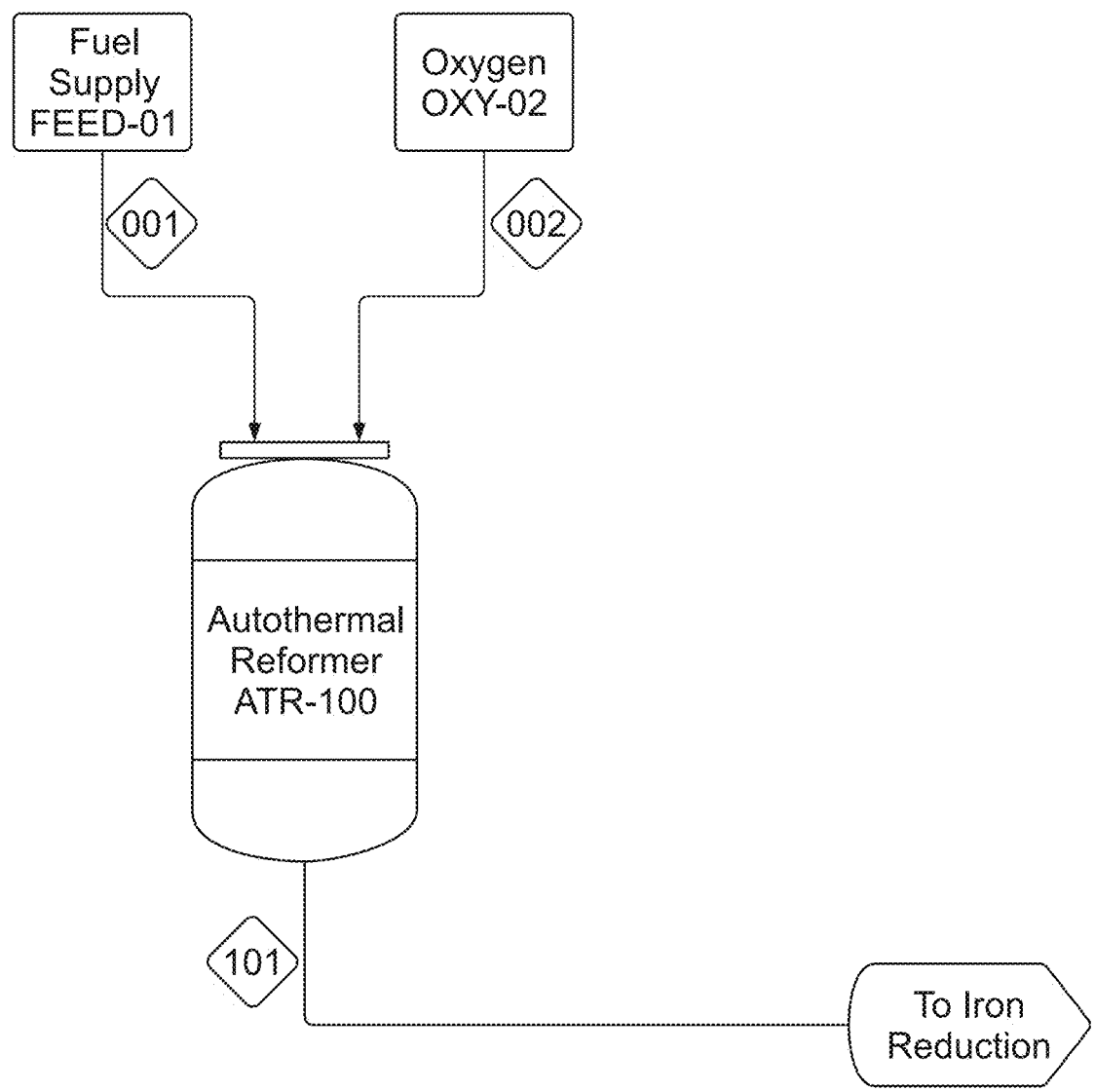
FIG. 1A depicts an exemplary process wherein syngas produced by a reformer is fed directly to a furnace for producing a material comprising iron, whereas FIG. 1B depicts syngas produced by the reformer being processed for removal of certain components prior to being fed to the furnace for producing the material comprising iron.

Terms used in the claims and specification are defined as set forth below unless otherwise specified.

The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either," "one of," "only one of," or "exactly one of."

II. System Environment Overview

Described herein, in some embodiments, are systems and methods for producing synthesis gas (syngas) using bio-oil. Generally, syngas includes hydrogen ($H_2$) and carbon monoxide (CO), but can also include other components, such as carbon dioxide, methane, etc. In some embodiments, syngas is produced by steam reforming bio-oil. In some embodiments, the bio-oil is provided in liquid form. In some embodiments at least some of the liquid bio-oil is transitioned into droplet form when entering a reformer for steam-reforming. In some embodiments, the reformer produces a gas stream including condensable gases, non-condensable gases, particulate material, inorganic material, or any combination thereof. The output from reformer can include, for example, syngas (e.g., including permanent gases, such as CO, $CO_2$, $H_2$, $CH_4$, $N_2$), condensable species (e.g., $H_2O$ and tars, which can be or include higher order hydrocarbon compounds that were not converted to permanent gases), and/or particulate (e.g., carbon and ash components from the bio-oil).

In some embodiments, the produced gas stream from the reformer, comprising syngas, is fed to a furnace (e.g., direct reducing furnace, shaft furnace) for reducing iron ore to iron (for example via a MIDREX® system). In some embodiments, the produced gas stream is fed directly to the furnace, or a system for reducing iron ore that may include pre-processing of the syngas prior to being fed to the furnace. In some embodiments, the gas stream produced from the reformer is further processed to remove one or more contaminants, particulate components, and/or condensable gases. In some embodiments, the gas stream produced is further processed so as to improve a quality of the syngas based on downstream processing requirements.

In some embodiments, syngas as produced via bio-oil corresponds to a reduction in global emissions as opposed to syngas produced via traditional methods (e.g., using natural gas). In some embodiments, such global emission reduction includes reduction in carbon dioxide ($CO_2$) emissions. In some embodiments, such reduction in carbon dioxide emissions is based on bio-oil being produced using biomass. In some embodiments, producing syngas using bio-oil, as described herein, can reduce global emissions (e.g., carbon dioxide emissions) by at least about 1%, 5%, 10%, 15%, 20%, 25%, 30%, 40%, or 50%.

Syngas may be used in various different downstream processes for producing one or more different products. For example, syngas may be used for iron making, which may include reduction of iron ore to iron (e.g., direct reduction iron, sponge iron), production of methanol, production of kerosene, and/or production of ammonia, among other processes. Accordingly, using syngas produced via bio-oil may result in a reduction of global emissions (e.g., carbon dioxide emissions) for steel making (which may include reduction of iron ore to iron), production of methanol, production of kerosene, and/or production of ammonia, among other processes.

Figure 1B:
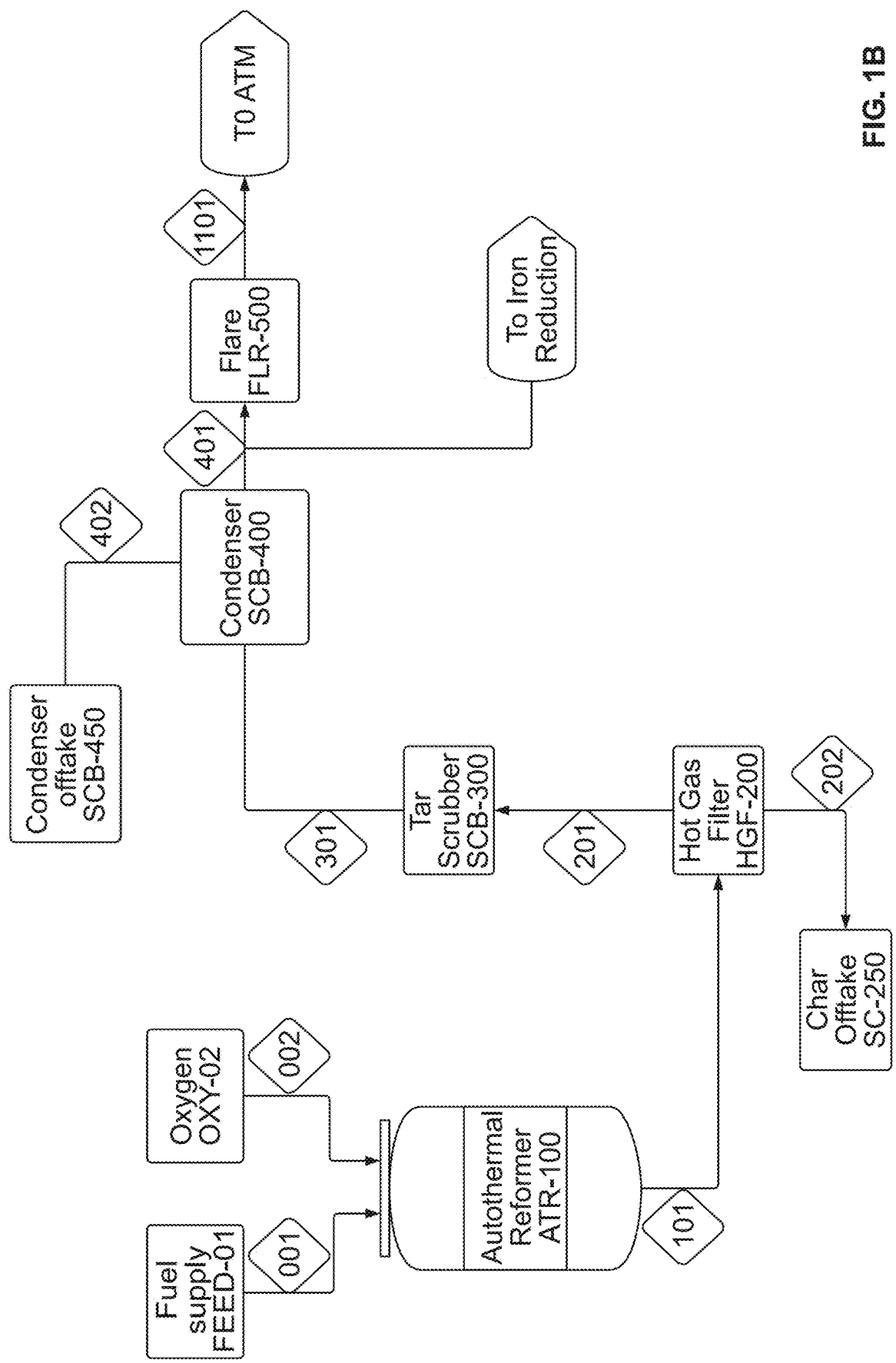
FIG. 1C is a schematic flow diagram of a system for producing syngas from bio-oil using a preheated oxygen stream, according to certain embodiments.

FIG. 1A depicts an exemplary flow diagram for a process of producing syngas from bio-oil, wherein the syngas (as part of the produced gas from the reformer ATR-100) is fed to a system (e.g., including a furnace) for reducing iron (e.g., from iron ore). The system may include one or more components for processing the syngas prior to feeding the furnace for reducing iron, or the syngas may be fed directly to the furnace. FIG. 1B depicts another exemplary flow diagram for a process of producing syngas from bio-oil, wherein the produced gas from the reformer is further processed to remove one or more contaminants, one or more particulate components, and/or one or more condensable gases (as described herein), ahead of being sent to the system for reducing iron. Certain exemplary conditions and compositional information for the various streams in the process are provided in FIGS. 2 and 3. FIGS. 4A-4M depict compositional information and characteristics of various exemplary bio-oil samples that were tested. FIGS. 4A-4B pertain to two samples of bio-oil, where along with compositional information such as carbon and hydrogen content that were identified, a heating value was identified, as well as a determination of metals and water in the bio-oil samples were also observed. Results from these samples includes approximately 31 to 35 wt % of carbon in the bio-oil. With respect to FIGS. 4C-4F, the amount of carbon in such samples were much higher (from about 46 wt % to about 55 wt %), though having a lower oxygen content. FIGS. 4G-4M depicted compositional information of different bio-oil samples including water content and on a dry basis, along with ash content. As noted, samples with high ash and/or moisture content generally correlated with a reduced amount of carbon in such bio-oil samples.

As depicted in FIGS. 1A and 1B, ATR-100 represents a reformer for producing syngas. In some embodiments, the reformer is an autothermal reformer and/or an entrained flow gasifier. As depicted, in some embodiments, the reformer (ATR-100) receives one or more feed streams. In some embodiments, the one or feed streams include bio-oil (stream 001, fuel supply) and/or oxygen (stream 002). The oxygen can be or include pure oxygen, industrially pure oxygen, or a gas that is at least about 90%, 95%, or 99% oxygen, by volume. In some embodiments, a steam feed stream and/or a carbon dioxide stream may be fed to the reformer (not shown).

As described herein, in some cases, bio-oil is obtained via biomass. In some cases, bio-oil corresponds to a liquid product made from biomass materials, which may include, for example, agricultural crops, algal biomass, municipal wastes, and/or agricultural and forestry by-products. In some embodiments, as described herein, the bio-oil is produced via biomass, using any method as known in the art. In some embodiments, bio-oil is produced from biomass via one or more thermo-chemical processes. For example, in some embodiments, bio-oil is produced via flash pyrolysis, hydrothermal liquefaction, or others as known in the art.

In some embodiments, bio-oil (stream 001) is fed to the reformer in liquid form. In some embodiments, bio-oil includes from about 20 wt % (by weight) to about 70 wt % carbon, from about 3 wt % to about 15 wt % hydrogen, and/or from about 20 wt % to about 75 wt % oxygen, on a dry basis or a wet basis (e.g., with or without considering the presence of water) (see FIG. 2 for example). In some embodiments, the bio-oil includes a water content, for example, due to water found in the biomass material. In some embodiments, the water in bio-oil is obtained via condensation of water droplets in air that the biomass materials and/or bio-oil are exposed to. In some embodiments, water is added to the bio-oil to boost the water content. In some embodiments, the ratio of mass flow rate of bio-oil to mass flow rate of water in the bio-oil feed stream is from about 1:2 to about 3:1.

In some embodiments, the bio-oil is stored for use in syngas production. For example, in some cases, bio-oil is stored in a container, tank, or other enclosure. In some embodiments, the bio-oil storage means (e.g., container, tank, etc.) is in fluid communication with the reformer (e.g., ATR-100). In some embodiments, the bio-oil is configured to be delivered to the reformer on a continuous basis, such that syngas production is a continuous process. In some embodiments, the bio-oil is configured to be delivered according to a batch basis, such that syngas production is a batch process.

In some embodiments, a pyrolysis plant can be located onsite (e.g., near the reformer) and can be used to produce the bio-oil. Additionally or alternatively, at least a portion of the bio-oil can be replaced by a pyrolysis off-gas from the pyrolysis plant. For example, the pyrolysis off-gas can form at least a portion of the bio-oil feed stream.

In some embodiments, the bio-oil is configured to be transferred to the reformer via a pump. In some embodiments, the pressure of the bio-oil stream being fed to the reformer is from about 500 psi to about 2000 psi, such as about 800 psi, 1000 psi, 1200 psi, or 1500 psi. In some embodiments, the pressure of the bio-oil stream being fed to the reformer is from about 1 psig to about 100 psig, from about 2 psig to about 50 psig, from about 3 psig to about 30 psig, or from about 5 psig to about 20 psig, such as about 8 psig, 10 psig, 12 psig, or 15 psig. In some embodiments, one or more pumps in series and/or parallel are configured to deliver the bio-oil to the reformer from the storage means.

In some embodiments, though the bio-oil may be pumped to the reformer in continuous liquid form, at least part of the bio-oil entering the actual reformer (e.g., ATR-100) is transitioned into droplet form. In some embodiments, providing the bio-oil in droplet form helps with the production of syngas. For example, in some cases, the bio-oil droplets can be exposed to oxygen for partial oxidation to maintain high temperatures. In some embodiments, the droplet form provides greater surface area of the bio-oil for reforming.

In some embodiments, heating the bio-oil does not vaporize the bio-oil. Instead, in some embodiments, heating the bio-oil changes certain properties of the bio-oil, such as increasing (or decreasing) the viscosity, and in some cases, heating the bio-oil forms a thick or solid substance (e.g., solid congealed fraction).

Accordingly, to provide the bio-oil in droplet form, in some embodiments, the bio-oil enters the reformer using an atomizing nozzle configured to create a fine bio-oil aerosol. In some embodiments, the bio-oil enters the reformer using a single-fluid swirl atomization nozzle. In some embodiments, prior to entering an atomizing nozzle or other outlet (e.g., pipe outlet), the flow path of the bio-oil (and optionally other feed streams) is configured to cause two high pressure streams to collide, thereby helping "shatter" the bio-oil streams into aerosols. In some embodiments, forming bio-oil droplets by colliding two streams may help reduce the risk of potential blocking of one or more holes in an atomizer (e.g., due to thickened bio-oil in the feed stream at high temperatures, as described herein). In some embodiments, the flow path (for colliding two high pressure streams) may include two different flows of bio-oil (e.g., stream 001) combining, wherein the two different flows may be from an original single flow path that split into two prior to re-joining, and/or the two different flows may be from two separate pumps (and/or two different storage means).

In some embodiments, the bio-oil is heated to high temperatures to help with syngas production, by, for example, providing high temperature droplets of bio-oil to the reformer. In some embodiments, as described herein, heating the bio-oil can change the viscosity and/or surface tension of the liquid bio-oil, which in some cases, increases the atomizing efficiency by forming smaller droplets. In some embodiments, the droplet size of the bio-oil entering the reformer is at most about 10 µm, 25 µm, 50 µm, 75 µm, or 100 µm. In some embodiments, the droplet size of the bio-oil entering the reformer is at most from about 10 µm to about 100 µm. In some embodiments, the droplet size of the bio-oil entering the reformer, as expressed by Sauter diameter $D_{3,2}$ is from about 10-40 µm (microns), such as for example 20-40 µm or 30-40 µm. In some embodiments, increasing the bio-oil feed temperature helps reduce the amount of heat required by the reformer to decompose the bio-oil, thereby decreasing the thermal load to reform each droplet, resulting in lower oxygen consumption, and higher equivalence ratios.

In some embodiments, the bio-oil is stored at room temperature. In some embodiments, the bio-oil feed stream (e.g., stream 001) is warmed prior to entering the reformer. For example, in some embodiments, the bio-oil is heated to at least 30° C., 40° C., 50° C., 60° C., 75° C., 90° C. 100° C., 110° C., or 125° C. In some embodiments, the bio-oil is heated from at least about 25° C. to about 150° C., such as from about 30° C. to about 80° C., from about 30° C. to about 50° C., or from about 50° C. to about 100° C. In some embodiments, the bio-oil is heated using a heat exchanger. In some embodiments, the bio-oil is heated using the gas produced by the reformer (e.g., via a heat exchanger). In some embodiments, the bio-oil is heated using an electric heater or steam.

In some embodiments, the bio-oil feed (e.g., stream 001) to the reformer is mixed with the oxygen feed (e.g., stream 002), thereby sustaining a partial oxidation reaction. In some embodiments, the bio-oil feed is mixed with the oxygen feed prior to entering the reformer (e.g., ATR-100), after entering the reformer, or both. In some embodiments, the amount of oxygen fed to the reformer and/or the amount of bio-oil fed to the reformer is regulated based on an equivalence ratio (ER), corresponding to the moles of oxygen fed to the reformer divided by the moles of oxygen necessary to achieve stoichiometric combustion of the feed. In some cases, lower equivalence ratios in the range of about 0.1 to 0.6, such as for example about 0.25 to 0.4, produce a higher energy syngas. In some cases, such lower equivalence ratios can produce syngas with higher concentrations of tars and particulates.

In some embodiments, the amount of steam fed to the reformer and/or the amount of bio-oil fed to the reformer is regulated based on a steam-to-carbon ratio (S/C), corresponding to the moles of steam fed to the reformer divided by the moles of the carbon in the feed. As described herein, in some embodiments, the amount of steam fed to the reformer can be based on the quality and water content in the bio-oil feed (e.g., stream 001). In some cases, increasing the S/C reduces soot particulate formation and/or build-up.

In some embodiments, the reforming temperature is from about 500° C. to about 2000° C., such as for example from about 900° C. to about 1500° C. In some embodiments, increasing the ER increases the reforming temperature, improves cracking rates, and/or improves reforming rates. In some embodiments, reforming the bio-oil is a self-sustaining partial combustion reaction, wherein heat required to reform the bio-oil is provided by the exothermic reforming reaction. In some embodiments, the reformer is required to be initially heated by a secondary heat input, so as to enable such reforming of the bio-oil, after which, the secondary heat input may no longer be needed given the self-sustaining characteristic of the reforming reaction. In some embodiments the secondary heat input comprises a heater, such as an electric heater, and/or combustion heater, configured to heat the reformer. In some embodiments, the reformer is fed with natural gas (e.g., methane) as fuel for the secondary heat input. In some embodiments, once the reformer attains a minimum temperature, heat from the secondary heat input is ceased.

In some embodiments, the reformer produces a gas stream (stream 101). In some embodiments, gas stream (stream 101), which comprises syngas, includes, as described herein, condensable gases, non-condensable gases, particulate matter, and inorganic matter. In some embodiments, the condensable portion includes any remaining, uncracked long-chain organic compounds (tars) and water vapor. In some embodiments, the non-condensable portion includes carbon monoxide, methane, trace hydrocarbons up to C6 (e.g., up to C4), carbon dioxide, and/or hydrogen. In some embodiments, some of the components of the gas stream (stream 101) are contaminants, which may include molecules containing chlorine, sodium, potassium, nitrogen, phosphorous, tar, gangue, and/or sulfur. In some cases, the gas stream is considered dirty just after leaving the reformer as it contains trace tars, particulates, and inorganic contaminants. As described herein, in some embodiments, the gas stream from the reformer is further processed to reduce or remove at least some of these contaminants. In some cases, however, said contaminants may not reduce the quality of a downstream product (e.g., a material comprising iron in the reduction process). In some embodiments, removal of certain contaminants (e.g., chlorine, sodium, potassium, nitrogen, etc.) may be cheaper if removed in a downstream process, such as during a steelmaking process (e.g., via slag formation in the electric arc furnace).

FIG. 2 depicts exemplary bio-oil feed (e.g., stream 001 in FIGS. 1A-1B) compositions having varying carbon content, where higher carbon content correspond to "heavy ends" bio-oil, lower carbon content correspond to "light ends", and medium FPBO refers to carbon content in between the heavy and light ends. FIG. 2 further depicts exemplary produced syngas compositions corresponding to the bio-oil feed (e.g., heavy and light ends bio-oil). As shown, syngas produced with heavy-ends bio-oil feed contained a higher amount of carbon monoxide and hydrogen relative to oxygen content, as compared with syngas produced with light-ends bio-oil feed. Thus, in some cases, syngas produced with heavy ends bio-oil feed is a more favorable reducing gas than syngas produced with light ends bio-oil feed.

Referring to FIG. 1B, in some embodiments, the gas stream (stream 101) passes through a filter HGF-200 (e.g., particulate filter, baghouse filter, hot gas filter, hot carbide candle filter, etc.). In some embodiments, the filter removes particulate matter found in the gas stream (that may have resulted due to, for example, partial combustion of the bio-oil in the reformer). In some cases, the particulate matter is mainly composed of char (e.g., solid carbon or biochar), trace amounts of ash, and/or other inorganic matter. In some embodiments, the filter is operated at least at about 250° C. to about 1000° C., such as from about 450° C. to about 900° C., so as to help avoid the formation of tar and soot agglomerates. In some cases, at a temperature of at least about 250° C. to about 900° C., such as at least about 450° C., char is collected on a fine mesh filter, wherein tar that is still in the gas phase pass through the char and filter. In some cases, the char works as a catalyst to crack long chain tars into non-condensable gas.

In some embodiments, the filtered gas stream (stream 201) is then passed through a tar scrubber (SCB-300) configured to remove trace tars present in the gas stream through adsorption, filtration, and/or using a bed of activated carbon. In some cases, activated carbon is also known to reduce hydrogen sulfide ($H_2S$) via adsorption as well. In some embodiments, the tar scrubber operates from about 200° C. to about 500° C., such as about 450° C. In some cases, however, tars, which can be or include unreformed bio-oil components, provide carbon to the material comprising iron (for example in a downstream direct reduction iron process) as they break down catalytically in the furnace in the presence of iron as a catalyst. In some cases, higher carbon can have three positive effects: (1) increases conductivity of the downstream electric arc furnace (EAF) melt which improves lifetime of the EAF's electrodes, (2) increases metallic yield by reducing any remaining iron oxides from the cores of ore granules that are exposed when they melt, and/or (3) supplies carbon to support slag foaming in EAFs.

In some embodiments, the filtered and scrubbed gas stream (stream 301) is then passed through a condenser (SCB-400), to condense out at least some of the condensable gases from the gas stream (stream 301). In some embodiments, the condenser includes a heat exchanger. For example, in some embodiments, the condenser (SCB-400) includes a shell and tube heat exchanger. In some embodiments, the gas stream (stream 301) is passed through the shell, whereas water is passed through the tube. In some cases, the gas stream (stream 301) is cooled to a temperature from about 10° C. to about 30° C., such as about 20° C. In some embodiments, the condensed fluid (e.g., condensed water, at stream 402) is separated from the gas stream. In some embodiments, the condensed fluid (e.g., water) is drawn through a pump and routed for storage, further processing, and/or waste. In some embodiments, the amount of condensed fluid is monitored to determine the amount of condensable gases in the gas stream (stream 301).

In some embodiments the gas stream (e.g., any one or more of stream 101, 201, 301 and 401) is further processed to remove or reduce the amount of sulfur therein. In some embodiments, such removal of sulfur is via a desulfurization process step, which may include an adsorbent and/or a membrane system. In some embodiments, the sulfur removal process is located before other traditional gas cleanup steps that are common to direct reduction processes (e.g., $CO_2$ scrubbing and dewatering).

Still referring to FIG. 1B, in some embodiments, syngas stream 401 is routed for storage, to flare (e.g., combusted using FLR-500) to produce stream 1101 (e.g., emitted to the atmosphere), and/or for use in a downstream process, as described herein (e.g., a direct reduction iron process, etc.). In certain implementations, any one or more, including all, of the process components after the reformer (e.g., SC-250, HGF-200, SCB-300, SCB-400, SCB-450, and/or FLR-500) shown in FIG. 1B may not be present. For example, the syngas may travel from the reformer to the downstream process (e.g., a furnace for ironmaking) with little or no intermediate processing (e.g., as shown in FIG. 1A).

In various examples, overall process efficiency and/or syngas quality can be improved by preheating the oxygen (stream 002) before the oxygen enters the reformer (e.g., ATR-100). Preheating the oxygen can increase temperatures in the reformer, which can improve the efficiency at which bio-oil is converted to syngas. Additionally or alternatively, preheating the oxygen can reduce the need for generating heat in the reformer by combustion (e.g., by burning the bio-oil). With less combustion, the syngas produced by the reformer can include fewer combustion products (e.g., $CO_2$ and $H_2O$) and can be of higher quality.

For example, in certain implementations, the reformer can utilize an autothermal gasification process in which heat is used to convert liquid bio-oil into syngas. At least a portion of the heat used to convert the bio-oil into syngas can be generated by partial combustion, which can be achieved by adding oxygen to the reformer in an amount less than that required for complete combustion. The partial combustion, however, produces combustion products (e.g., $CO_2$ and $H_2O$) that can reduce the quality or value of the syngas.

Advantageously, by preheating the oxygen as described herein, the need for generating heat in the reformer by partial combustion is reduced. Preheating the oxygen can improve bio-oil to syngas conversion efficiency (e.g., due to higher temperatures in the reformer), and it can improve syngas quality (e.g., due to fewer combustion products in the syngas).

Figure 1C:
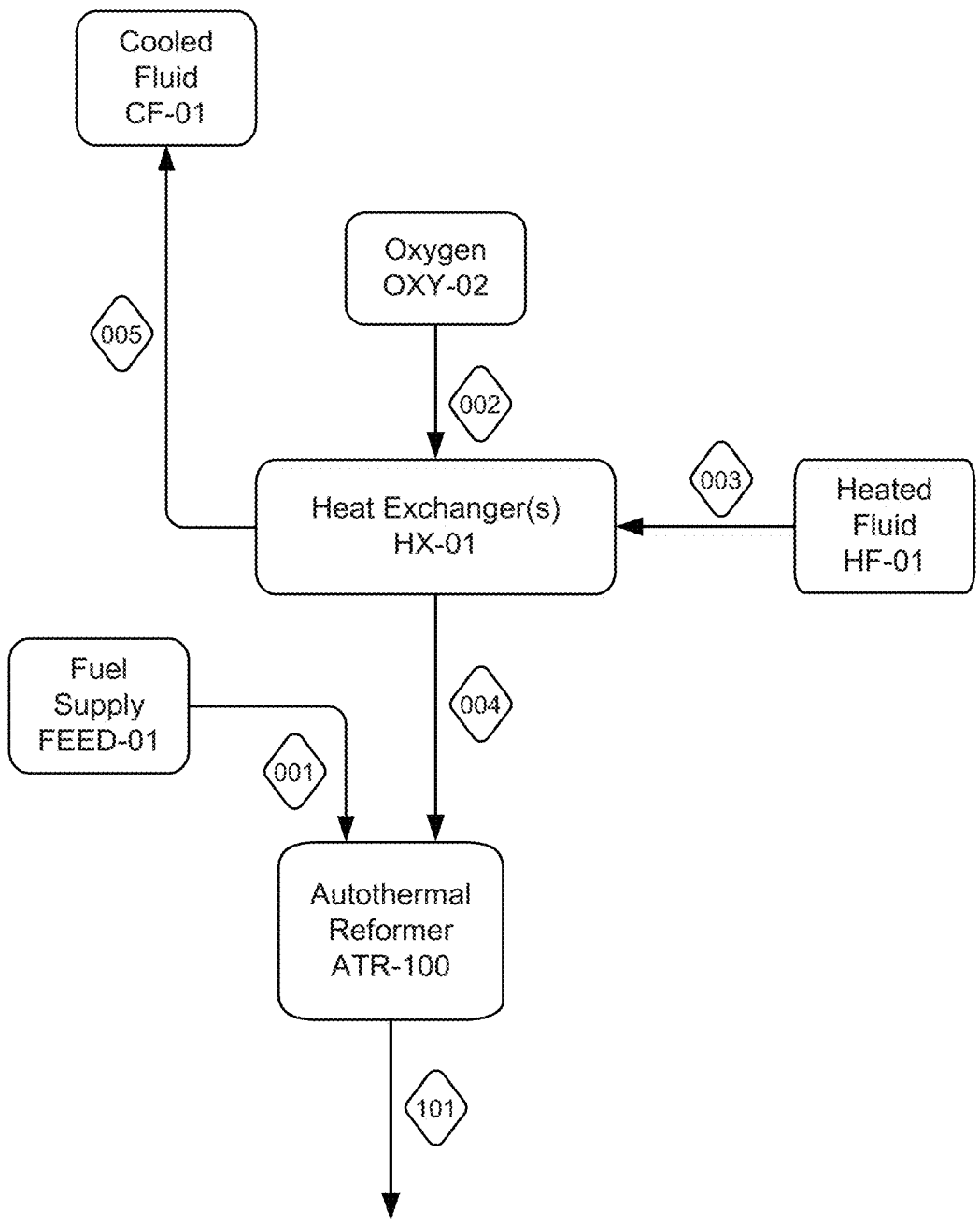

Referring to FIG. 1C, in certain examples, the oxygen (stream 002) can be preheated using one or more heat exchangers (HX-01) or other heat source(s). For example, the one or more heat exchangers can transfer heat to the oxygen from a stream 003 of heated fluid (HF-01). The heated fluid can be or include, for example, syngas (e.g., from stream 101, 201, 301, or 401), a combustion product (e.g., from stream 1101), a fluid that enters or exits a process component (e.g., the hot gas filter HGF-200, the tar scrubber SCB-300, the condenser SCB-400, the flare FLR-500, and/or other component), a fluid obtained from an ironmaking furnace, or any combination thereof. In some examples, multiple heat exchangers can be used (e.g., arranged in series, in parallel, or a combination thereof), with each heat exchanger receiving heat from a respective stream or process component. Additionally or alternatively, in some examples, the oxygen can be preheated using an electric heater, a heater fueled by natural gas, propane, bio-oil, or other fuel source, or other heating unit (e.g., separate from the reformer). A stream 004 of preheated oxygen can be provided to the reformer (ATR-100). The stream 003 of heated fluid (HF-01) can be cooled by the one or more heat exchangers (HX-01) to produce a stream 005 of cooled fluid (CF-01).

In various examples, the one or more heat exchangers and/or other heater can preheat the oxygen to a temperature ranging from about 100° C. to about 200° C., from about 200° C. to about 300° C., from about 300° C. to about 400° C., from about 400° C. to about 500° C., or from about 500° C. to about 1000° C. For example, the preheated oxygen can have a temperature greater than 200° C., greater than 300° C., greater than 400° C., or greater than 500° C. The preheated oxygen (stream 004) can be provided as an input to the reformer (ATR-100) and used to generate syngas from bio-oil, as described herein.

In some examples, preheating the oxygen may cause the reformer to produce higher particulate yields. Adding steam (gaseous $H_2O$) to the reformer in such instances can reduce soot particulate formation and/or build-up.

In some embodiments, the syngas is used in a direct reduction iron process for reducing iron ore, so as to produce material comprising iron. In some embodiments, the material comprising iron comprises one or more of pure iron, direct reduced iron, hot briquetted iron, pig iron, molten iron, hot metal, sponge iron, or an iron rich metal. In some embodiments, the material comprising iron is used to make one or more products, such as steel, as known in the art. In some embodiments, the material comprising iron comprises iron metallics high in gangue, which may then be smelted (such as in an electric smelting furnace) to separate iron from slag, and thereby producing molten iron which can be directly used in a steelmaking process or solidified to a synthetic pig iron.

In some cases, producing said material comprising iron includes the following transition: $Fe_2O_3$ (hematite)→$Fe_3O_{43}$ (magnetite), $Fe_2O_3$→FeO (wustite) $Fe_2O_3$→Fe (metallic iron). In some cases, steel is produced via iron (e.g., Fe→steel alloys). In some cases, ironmaking produces metallic iron (Fe) from iron ore. As described herein, traditionally a feedstock like coal or natural gas is used to produce syngas (e.g., containing CO and/or $H_2$), which provides a reducing agent that will remove the oxygen off the $Fe_2O_3$ to produce $Fe+CO_2+H_2O$ via the aforementioned reduction sequence. In some embodiments, as described herein, syngas produced from bio-oil (according to an embodiment here) may be used instead of or in addition to syngas produced from coal, natural gas, or other syngas fuel sources. In some embodiments, two technologies used to produce iron include Blast Furnaces (coal) and Direct Reduction Furnaces (natural gas).

In some embodiments, in a blast furnace, the coal (e.g., pure C) is burned at high temperatures and undergoes the Boudouard reaction with pure oxygen to form CO. In some embodiments, the CO reduces the iron ore above the melting point of the metallic iron/ore, and produces a liquid flow of hot metal. In some cases, the liquid flow of hot metal flows into a Basic Oxygen Furnace for steelmaking (adding carbon, alloying, mixing with scrap, etc.). In some embodiments, blast furnaces and basic oxygen furnaces are tolerant of high slag proportions, and so are amenable to both magnetite and hematite lump ores and pellets (beneficiated if necessary to 60-67% Fe content, plus oxygen and some gangue).

In some embodiments, in a direct reduction process, natural gas is steam reformed to CO and $H_2$. As described herein, in some embodiments syngas produced from bio-oil (according to an embodiment herein) can be used in a direct reduction process. In some embodiments, using a direct reduction furnace (for example), the CO and $H_2$ reduce the iron ore below the melting point of the metallic iron/ore, and produce a solid flow of sponge iron pellets. In some embodiments, these pellets are either used onsite or are compressed into hot briquetted iron bricks for transport offsite. In some embodiments, the pellets or briquettes are feedstock for steelmaking in an Electric Arc Furnace (adding carbon, alloying, mixing with scrap, etc.). In some embodiments, the electric arc furnace is more sensitive to slag proportions, and so typically direct reduction furnaces only use high metal content pellets (>67% Fe, ~30% oxygen and a few points of gangue) which must be beneficiated up from whatever original ore content at or near the mine. In some cases, beneficiation of pellets before direct reduction is not performed, and then direct reduction is paired with other smelting routes (instead of an electric arc furnace) to better handle the higher slag content.

In some embodiments, using a direct reduction iron process, inside the furnace, reducing gas of CO and $H_2$ removes oxygen out of the iron oxide to evolve it from hematite ($Fe_2O_3$), to magnetite ($Fe_3O_4$), to wustite (FeO), to metallic iron (Fe) and sometimes even to cementite (FeC). In some cases, these reactions proceed at around about 700-1200° C. (e.g., about 900-1000° C.).

In some embodiments, the CO reactions are mostly exothermic, releasing energy/heat that continues to drive the reactions forward. In some cases, by contrast, all the $H_2$ reactions are endothermic. Accordingly, in some cases, this puts an immediate focus on maintaining the right ratio of $H_2$:CO to maintain a stable operating temperature. In some existing direct reduction iron processes, the standard is about a 1 to 2 (e.g., 1.5) $H_2$:CO ratio, though it can vary from about 0.2 to about 4 with other process changes.

In some cases, where there is an additional heat source, the furnace can operate at full $H_2$ with no CO. In some cases, such a process may lead to zero or substantially zero $CO_2$ ironmaking with pure $H_2$ from renewable-powered electrolysis when there is an external heating source.

In some embodiments, the crystal structure of the iron oxides changes as it evolves. In some cases, during the transition from hematite to magnetite, this results in significant expansion of the volume of the ore, which tends to crack and expose the ore to additional intrusion of reducing gas. In some cases, during the transition from wustite to iron, the reaction with CO is 100× slower than the reaction with $H_2$ (despite the exo-thermicity vs. endo-thermicity), because the $H_2$ helps nucleate the crystal structure changes while the CO does not.

In some embodiments, a direct reduction furnace has no ambient air intrusion, so the flue gas coming out of the furnace is a well-contained pipe of CO, $CO_2$, $H_2$ and $H_2O$.

In some cases, the $CO_2$ can be separated by condensing off the water and using a carbon capture system, in some cases an Amine based unit, and/or in some cases Pressure Swing Adsorption. In some cases, this makes direct reduction furnaces a perfect target for flue stack carbon capture and sequestration.

As described herein, in some embodiments, the syngas can be fed to a furnace (e.g., direct reducing furnace, shaft furnace) for reducing iron ore to iron (for example via a MIDREX® system). In some cases, the syngas is further processed (e.g., gas cleanup as described herein) prior to being fed to a shaft furnace.

In another embodiment, the syngas produced via bio-oil is formed within a furnace itself (such as for example, similar to a HYL ENERGIRON® system), wherein the reformer and furnace may be combined. Accordingly, the syngas may be formed and used to reduce the iron ore in the same shaft furnace, which may increase carbon content, and eliminate the need for a separate reformer.

In some embodiments, in reducing iron ore to iron using syngas produced by bio-oil (e.g., according to an embodiment described herein), one or more of particulate matter, tars, chlorine and sulfur are not removed. In some embodiments, for example, direct reduction grade Iron ore pellets comprise between about 50% to about 80% (e.g., 67%+) iron, wherein in some cases, such iron ore pellets comprise about 20% to about 50% (e.g., 30%) oxygen content, and about 1% to about 10% (e.g., 3%) gangue content (e.g. $SiO_2$, CaO, $Al_2O_3$, MgO, etc.).

In some embodiments, about 0.4 to about 1.00 (e.g., 0.75) ton Bio-oil is required to reduce 1 ton material comprising iron (e.g, hot briquetted iron). In some embodiments, the entire ironmaking system including boilers is fueled with bio-oil, changing bio-oil demand (e.g., increasing the amount of Bio-oil used, for fuels and boilers).

In some embodiments, reforming the bio-oil with the iron ore reduction beneficially increases cementite and graphite content aka carbon in the resulting sponge iron (reduced iron ore), such that letting tars be reformed in the furnace itself may actually increase the quality and value of the sponge iron produced by increasing its carbon content. For example, an estimated tar loading of 4% with the bio-oil, which if translated at 100% to carbon content of the pellet, may result in an improvement in the quality of the produced iron as compared to traditional direct reduction iron processes.

Each numerical value presented herein, for example, in a table, a chart, or a graph, is contemplated to represent a minimum value or a maximum value in a range for a corresponding parameter. Accordingly, when added to the claims, the numerical value provides express support for claiming the range, which may lie above or below the numerical value, in accordance with the teachings herein. Absent inclusion in the claims, each numerical value presented herein is not to be considered limiting in any regard.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

Exemplary Embodiments

Disclosed herein, in some aspects, is a process for producing syngas, comprising: providing bio-oil to a reformer, wherein the bio-oil is at least partially atomized when entering the reformer; and reforming the bio-oil within the reformer, thereby producing syngas.

In some embodiments, the bio-oil is at least partially atomized using an atomizing nozzle. In some embodiments, the bio-oil is at least partially atomized based on providing the bio-oil in at least two streams that collide with each other prior to entering the reformer. In some embodiments, the process further comprises using the syngas to produce a material comprising iron. In some embodiments, the process further comprises using the syngas to reduce iron ore to a metallic iron containing product.

In some embodiments, the process further comprises providing oxygen to the reformer, wherein the oxygen at least partially oxidizes the bio-oil. In some embodiments, the process further comprises regulating the amount of oxygen provided to the reformer based on an equivalence ratio (ER) corresponding to moles of oxygen fed to the reformer divided by moles of oxygen necessary to achieve stoichiometric combustion of the bio-oil. In some embodiments, the ER is from about 0.1 to about 0.6.

In some embodiments, the process further comprises heating the bio-oil prior to providing the bio-oil to the reformer. In some embodiments, the produced syngas is used to heat the bio-oil. In some embodiments, the bio-oil is liquid or substantially liquid. In some embodiments, the bio-oil is provided to the reformer via a pump. In some embodiments, the bio-oil is provided to the reformer at a pressure from about 5 psig to about 20 psig.

In some embodiments, the reforming comprises steam reforming. In some embodiments, the steam is produced in the reformer via water contained in the bio-oil and/or provided with the bio-oil.

In some embodiments, the process further comprises removing one or more contaminants from the syngas. In some embodiments, the one or more contaminants comprise molecules containing sulfur, chlorine, potassium, nitrogen, sodium, phosphorous, tar, particulate and/or gangue, or any combination thereof. In some embodiments, the process further comprises removing one or more condensable gases, non-condensable gases, particulate components, inorganic components, or any combination thereof from the syngas.

In some embodiments, the bio-oil comprises from about 20 wt % to about 70 wt % carbon, from about 3 wt % to about 16 wt % hydrogen, and from about 20 wt % oxygen to about 75 wt % oxygen. In some embodiments, the bio-oil is heated to from about 30° C. to about 80° C. prior to being provided to the reformer. In some embodiments, the atomized bio-oil comprises a droplet size from about 10 µm to about 40 µm.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil.

In some embodiments, the system further comprises an oxygen source for providing oxygen to the reformer. In some embodiments, the flow path comprises an atomizing nozzle for at least partially atomizing the bio-oil. In some embodiments, the system further comprises one or more sub-systems or processing equipment configured to remove a contaminant, a condensable gas, a non-condensable gas, a particulate component, an inorganic component, or a combination thereof from the produced syngas. In some embodiments, the one or more sub-systems comprises a filter, a scrubber, a condenser, an absorber, a membrane, or a combination thereof. In some embodiments, the one or more sub-systems is configured to remove a contaminant from the produced syngas, the contaminant comprising molecules containing sulfur, chlorine, potassium, nitrogen, sodium, phosphorous, tar, particulate, gangue, or a combination thereof.

In some embodiments, the system further comprises a pump for pumping the bio-oil to the reformer, wherein the bio-oil is liquid or substantially liquid. In some embodiments, the pump discharges the bio-oil at a pressure from about 5 psig to about 20 psig. In some embodiments, the system further comprises a heat exchanger for heating the bio-oil prior to entering the reformer. In some embodiments, the heat exchanger uses the syngas produced from the reformer to heat the bio-oil.

In some embodiments, the syngas is used to reduce iron ore to iron. In some embodiments, the system further comprises a furnace configured to receive the produced syngas and iron ore, such that the furnace is configured to reduce the iron ore to iron using the syngas.

Disclosed herein, in some aspects, is a system for producing syngas, comprising: a bio-oil source containing bio-oil; a reformer for reforming the bio-oil to produce the syngas; and a flow path fluidly coupling the bio-oil source to the reformer, such that the bio-oil is configured to flow from the bio-oil source to the reformer, wherein the flow path is configured to at least partially atomize the bio-oil. In some embodiments, using the syngas to produce the material comprising iron comprises reducing iron ore to iron.

In another aspect, the subject matter of this disclosure relates to a system for producing syngas. The system includes: a source of bio-oil; a source of oxygen; a heater for preheating the oxygen; and a reformer configured to (i) receive the bio-oil and the preheated oxygen and (ii) produce syngas.

In certain examples, the bio-oil was produced from pyrolysis of biomass. The heater can be or include at least one heat exchanger. The heat exchanger can be configured to transfer heat to the oxygen from at least one of (i) the syngas, (ii) a heated fluid obtained from syngas processing equipment, (iii) a heated fluid obtained from combustion of the syngas, or (iv) a heated fluid obtained from a furnace used to produce metallic iron using the syngas. The heater can be configured to preheat the oxygen to a temperature of at least 100° C. The reformer can be provided with the preheated oxygen in an amount that is insufficient for complete combustion of the bio-oil. The reformer can be or include an autothermal reformer configured to perform a self-sustaining partial oxidation reaction with the bio-oil to produce the syngas. The reformer can be configured to receive pyrolysis off-gas in addition to the bio-oil and the preheated oxygen.

In some implementations, the system includes one or more sub-systems configured to remove a component from the syngas, the component including at least one of a contaminant, a condensable gas, a non-condensable gas, a particulate component, an inorganic component, or any combination thereof. The one or more sub-systems can include a filter, a scrubber, a condenser, an absorber, a membrane, or any combination thereof. The system can include an atomizing nozzle configured to atomize the bio-oil and provide the reformer with a bio-oil aerosol. The system can include a bio-oil heater for preheating the bio-oil before the bio-oil is received by the reformer. The system can include a furnace configured to (i) receive the syngas and iron ore and (ii) reduce the iron ore to metallic iron using the syngas.

In another aspect, the subject matter of this disclosure relates to a method of producing syngas. The method includes: providing bio-oil; providing oxygen; preheating the oxygen; and providing the bio-oil and the preheated oxygen to a reformer configured to produce syngas.

In certain examples, preheating the oxygen can include using at least one heat exchanger to transfer heat to the oxygen from at least one of (i) the syngas, (ii) a heated fluid obtained from syngas processing equipment, (iii) a heated fluid obtained from combustion of the syngas, or (iv) a heated fluid obtained from a furnace used to produce metallic iron using the syngas. Preheating the oxygen can include heating the oxygen to a temperature of at least 100° C. The reformer can be or include an autothermal reformer configured to perform a self-sustaining partial oxidation reaction with the bio-oil to produce the syngas.

In some implementations, the method can include removing a component from the syngas, the component including at least one of a contaminant, a condensable gas, a non-condensable gas, a particulate component, an inorganic component, or any combination thereof. Providing the bio-oil to the reformer can include atomizing the bio-oil to produce a bio-oil aerosol. Providing the bio-oil to the reformer can include preheating the bio-oil. The method can include: providing the syngas and iron ore to a furnace; and reacting the iron ore with the syngas in the furnace to produce metallic iron.

All publications, patents, patent applications and other documents cited in this application are hereby incorporated by reference herein in their entireties for all purposes to the same extent as if each individual publication, patent, patent application or other document were individually indicated to be incorporated by reference for all purposes. While various specific embodiments have been illustrated and described, the above specification is not restrictive. It will be appreciated that various changes can be made without departing from the spirit and scope of the present disclosure(s). Many variations will become apparent to those skilled in the art upon review of this specification.

What is claimed is:

1. A system for producing syngas, comprising:
   a source of bio-oil;
   a source of oxygen;
   a heater for preheating the oxygen; and
   a reformer configured to (i) receive the bio-oil and the preheated oxygen and (ii) produce syngas, wherein the reformer is an autothermal reformer configured to perform a self-sustaining partial oxidation reaction with the bio-oil to produce the syngas.

2. The system of claim 1, wherein the bio-oil was produced from pyrolysis of biomass.

3. The system of claim 1, wherein the heater comprises at least one heat exchanger.

4. The system of claim 3, wherein the heat exchanger is configured to transfer heat to the oxygen from at least one of (i) the syngas, (ii) a heated fluid obtained from syngas processing equipment, (iii) a heated fluid obtained from combustion of the syngas, or (iv) a heated fluid obtained from a furnace used to produce metallic iron using the syngas.

5. The system of claim 1, wherein the heater is configured to preheat the oxygen to a temperature of at least 100° C.

6. The system of claim 1, wherein the reformer is provided with the preheated oxygen in an amount that is insufficient for complete combustion of the bio-oil.

7. The system of claim 1, wherein the reformer is configured to receive pyrolysis off-gas in addition to the bio-oil and the preheated oxygen.

8. The system of claim 1, further comprising one or more sub-systems configured to remove a component from the syngas, the component comprising at least one of a contaminant, a condensable gas, a non-condensable gas, a particulate component, an inorganic component, or any combination thereof.

9. The system of claim 8, wherein the one or more sub-systems comprise a filter, a scrubber, a condenser, an absorber, a membrane, or any combination thereof.

10. The system of claim 1, further comprising an atomizing nozzle configured to atomize the bio-oil and provide the reformer with a bio-oil aerosol.

11. The system of claim 1, further comprising a bio-oil heater for preheating the bio-oil before the bio-oil is received by the reformer.

12. The system of claim 1, further comprising a furnace configured to (i) receive the syngas and iron ore and (ii) reduce the iron ore to metallic iron using the syngas.

13. A method of producing syngas, comprising:
providing bio-oil;
providing oxygen;
preheating the oxygen; and
providing the bio-oil and the preheated oxygen to a reformer configured to produce syngas, wherein the reformer is an autothermal reformer configured to perform a self-sustaining partial oxidation reaction with the bio-oil to produce the syngas.

14. The method of claim 13, wherein preheating the oxygen comprises using at least one heat exchanger to transfer heat to the oxygen from at least one of (i) the syngas, (ii) a heated fluid obtained from syngas processing equipment, (iii) a heated fluid obtained from combustion of the syngas, or (iv) a heated fluid obtained from a furnace used to produce metallic iron using the syngas.

15. The method of claim 13, wherein preheating the oxygen comprises heating the oxygen to a temperature of at least 100° C.

16. The method of claim 13, further comprising removing a component from the syngas, the component comprising at least one of a contaminant, a condensable gas, a non-condensable gas, a particulate component, an inorganic component, or any combination thereof.

17. The method of claim 13, wherein providing the bio-oil to the reformer comprises atomizing the bio-oil to produce a bio-oil aerosol.

18. The method of claim 13, wherein providing the bio-oil to the reformer comprises preheating the bio-oil.

19. The method of claim 13, further comprising:
providing the syngas and iron ore to a furnace; and
reacting the iron ore with the syngas in the furnace to produce metallic iron.

* * * * *